(12) United States Patent
Momochi et al.

(10) Patent No.: US 6,357,977 B1
(45) Date of Patent: *Mar. 19, 2002

(54) PROCESSING METHOD FOR CARVING A WORKPIECE

(75) Inventors: Takeshi Momochi, Numazu; Masahito Shiozaki, Niigata; Toshihiro Ueta, Mishima, all of (JP)

(73) Assignee: Toshiba Kikai Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,684

(22) Filed: Jan. 27, 1999

(30) Foreign Application Priority Data

Jan. 27, 1998 (JP) .......................................... 10-013976

(51) Int. Cl.7 ............................. B23C 9/00; G05B 13/04
(52) U.S. Cl. ........................ 409/132; 700/173; 700/188
(58) Field of Search .................................. 409/132, 131, 409/80; 318/572, 571; 700/187, 173, 182, 188; 29/898.048

(56) References Cited

U.S. PATENT DOCUMENTS

| 4,703,415 A | * | 10/1987 | Kishi et al. | .................... 409/80 |
| 4,723,219 A | * | 2/1988 | Beyer et al. | ............. 318/572 X |
| 4,739,489 A | * | 4/1988 | Kishi et al. | ............. 318/571 X |
| 4,833,617 A | * | 5/1989 | Wang | .......................... 700/173 |
| 5,493,502 A | * | 2/1996 | Niwa | .......................... 700/188 |
| 5,823,721 A | * | 10/1998 | Wagenseil | ......... 29/898.048 X |
| 6,099,216 A | * | 8/2000 | Momochi et al. | ........... 409/132 |

FOREIGN PATENT DOCUMENTS

| JP | 156604 | * | 6/1988 | ................. 409/201 |

* cited by examiner

Primary Examiner—William Briggs
(74) Attorney, Agent, or Firm—Pillsbury Winthrop

(57) ABSTRACT

A processing method and a processing machine for restraining abrupt increase in a load applied to a tool in entering a workpiece and for avoiding decrease in tool's life span are provided. When an end mill EM is entered into a processing surface of a workpiece W, the end mill EM is first entered obliquely to a processing surface of the workpiece W, and is moved oppositely to the entering direction while keeping the cutting depth. Alternatively, the end mill EM is entered obliquely to the processing surface of the workpiece W and is moved oppositely to the entering direction while gradually increasing the cutting depth of the end mill EM. When the cutting depth reaches a predetermined cutting depth, the end mill EM is moved parallel to the processing surface of the workpiece W.

3 Claims, 11 Drawing Sheets

F I G. 7 (A)
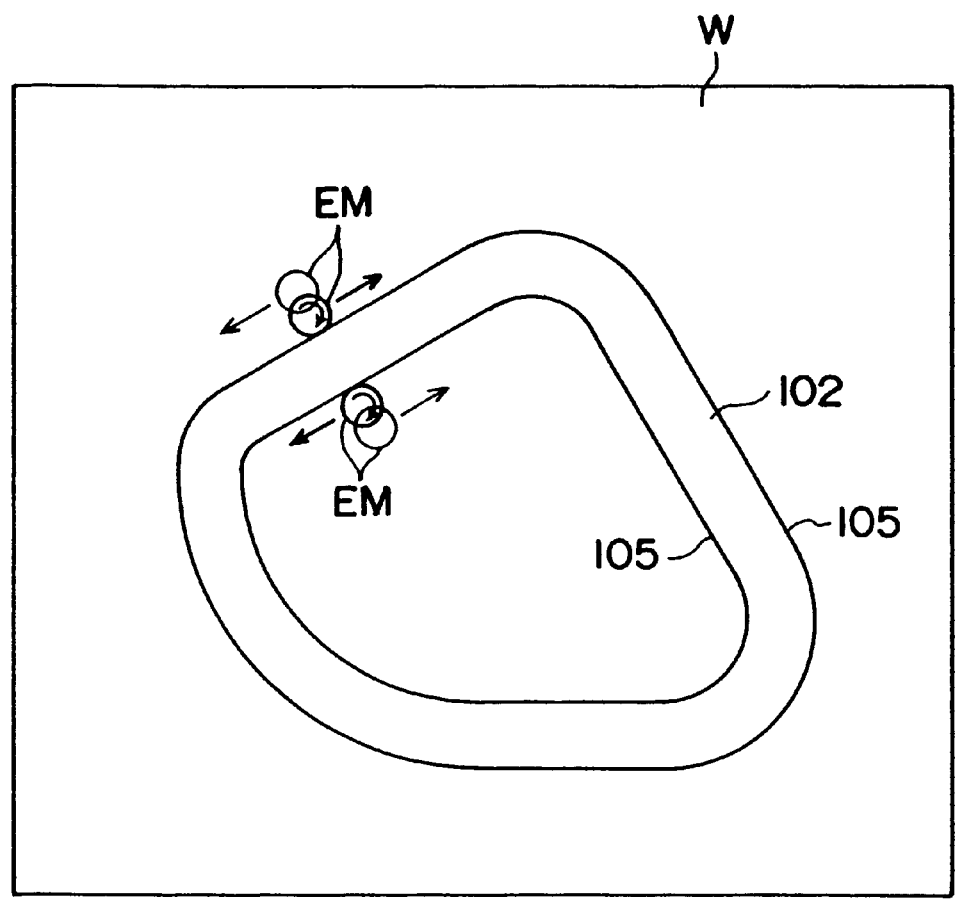
F I G. 7 (B)
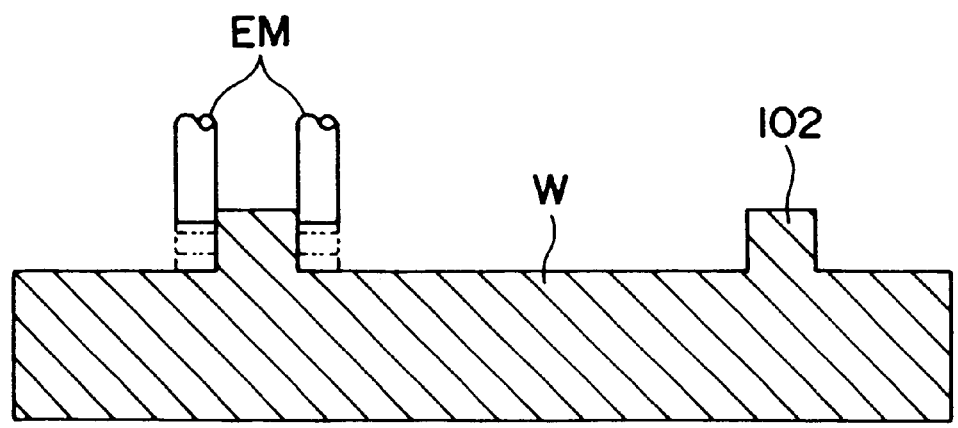

F I G. 8 (A)
UP-CUT
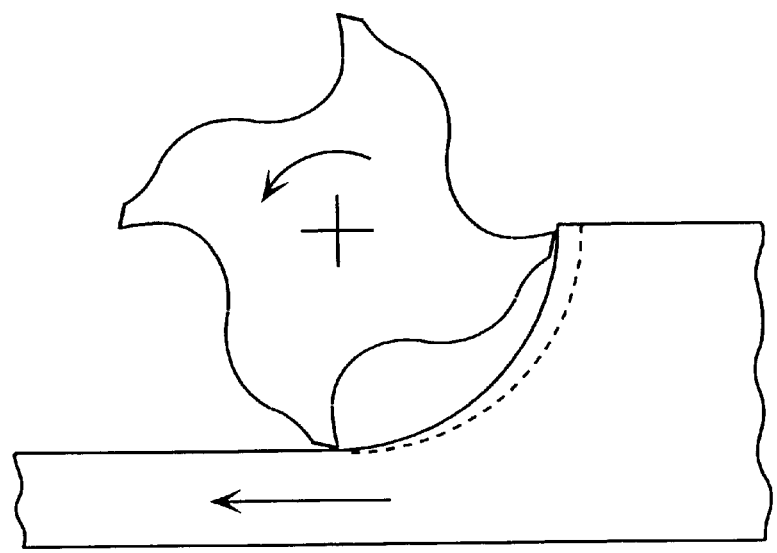
F I G. 8 (B)
DOWN-CUT
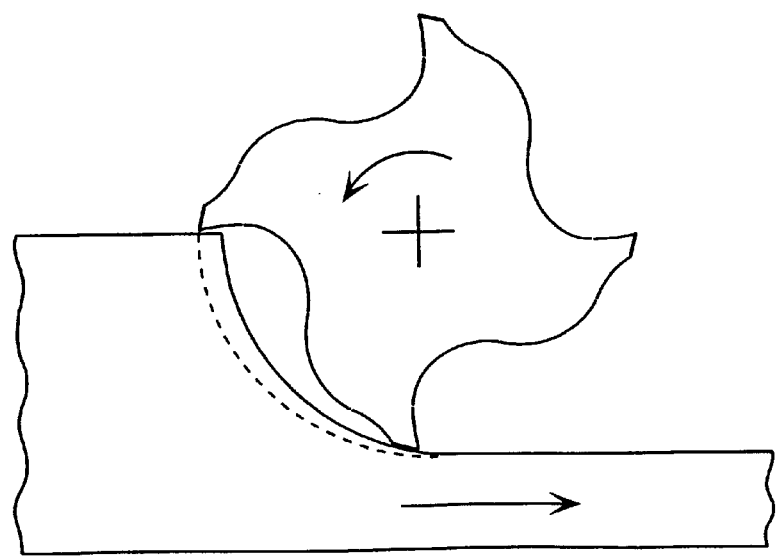

PROCESSING METHOD FOR CARVING A WORKPIECE

BACKGROUND OF THE INVENTION

1. Field of the Invention

The present invention relates to a processing method and a processing apparatus for carving a workpiece using a rotary tool. More specifically, it relates to a processing method and a processing apparatus for carving a concave or a convex portion having a predetermined configuration to, for instance, a mold material using an end mill.

2. Description of Related Art

Conventionally, a workpiece is carved using a rotary tool such as an end mill as follows. First, as shown in FIG. 10, the rotary tool T enters a processing surface of the workpiece W at a right angle to carve to a predetermined cutting depth. Subsequently, the rotary tool T is moved parallel to the processing surface of the workpiece W to cut at a constant depth while keeping the predetermined cutting depth to carve a concave portion and a convex portion.

However, according to the above cutting method, an entire blade of the pointed end of the rotary tool T touches the workpiece W when the rotary tool T enters the processing surface of the workpiece W at a right angle. Consequently, a load applied to the rotary tool T increases abruptly when the rotary tool T touches the workpiece W, thereby decreasing the tool's life span.

A method for solving the above disadvantage has been proposed. As shown in FIG. 11, the rotary tool T first approaches the processing surface of the workpiece W while revolving (helical movement) a central axis of the rotary tool T, and the rotary tool T enters the processing surface of the workpiece W to a predetermined depth. Subsequently, the rotary tool T is moved parallel to the processing surface of the workpiece W to cut the workpiece W keeping the cutting depth to carve the concave portion and the convex portion.

According to the cutting method shown in FIG. 11, the load applied to the rotary tool T in cutting (starting to contact) the workpiece W can be reduced as compared to the method shown in FIG. 10.

However, subsequently to the cutting, the rotary tool T is moved parallel to the processing surface of the workpiece W while keeping the predetermined cutting depth and the workpiece W is carved successively by touching an entire side of the rotary tool T to the workpiece W. Accordingly, the load applied to the rotary tool T abruptly increases in initiating the actual carving step and decrease the tool's life span is decreased.

The above-described load increase in starting the actual cutting can not be solved by the cutting method shown in FIG. 11.

Further, the rotary tool T has to be moved in helical movement to enter the processing surface of the workpiece W when a groove is carved by the cutting method shown in FIG. 11. Accordingly, the diameter of the rotary tool T has to be at least smaller than the groove to be carved, which means that the diameter of the rotary tool T has to be small in accordance with a width of the groove. Therefore, the tool is likely to be broken or damaged because of insufficient strength.

SUMMARY OF THE INVENTION

An object of the present invention is to provide a processing method and a processing machine for restraining an abrupt increase of a load applied to a tool in cutting and for avoiding a decrease in the tool's life span to cope with the above-described problem.

A processing method according to the present invention is for carving a workpiece using a rotary tool. The processing method is characterized in having the steps of entering the rotary tool obliquely to the processing surface of the workpiece by relatively moving the rotary tool and the workpiece; and carving the workpiece by relatively moving the rotary tool and the workpiece in a direction opposite to the moving direction during the entering step.

Obliquely entering the rotary tool to the processing surface of the workpiece refers to moving the rotary tool along the processing surface of the workpiece while gradually increasing a cutting depth of the rotary tool.

An entering angle of the rotary tool in obliquely entering the processing surface of the workpiece is preferably moderate relatively to the processing surface and is preferably determined in relation to a cutting depth.

In relatively moving the rotary tool in the direction opposite to the moving direction, the rotary tool is not necessary to move on the same locus as the entering locus, but the locus may be slightly diverged relatively to the entering direction.

The rotary tool and the workpiece may be relatively moved one-dimensionally or two-dimensionally. However, the rotary tool and the workpiece are preferably arranged to be movable in three-dimensional directions (X, Y and Z-axis directions orthogonal with each other. An end mill and a milling cutter are preferably used for the rotary tool.

According to the above arrangement, since the rotary tool and the workpiece are relatively moved so that the rotary tool enters obliquely to the processing surface of the workpiece, a load applied to the rotary tool in entering gradually increases. In other words, the load applied to the rotary tool does not increase abruptly, thereby restraining a decrease in tool's life span.

Subsequently, the rotary tool and the workpiece are moved relative to each other in a direction opposite to the X and Y moving direction during the entering step while keeping the depth constant. A sloping portion left by the rotary tool in entering obliquely to the processing surface of the workpiece in the previous step is gradually carved when the rotary tool moves in the direction opposite to the entering direction. Accordingly, the load applied to the rotary tool is not abruptly increased, thereby also restraining the decrease in tool's life span.

In the above arrangement, the rotary tool and the workpiece may be relatively moved while keeping a constant cutting depth of the workpiece by the rotary tool during the carving step.

Alternatively, the rotary tool and the workpiece may be relatively moved while gradually increasing the cutting depth of the workpiece by the rotary tool during the carving step. According to the above arrangement, initial section of the carving step constitutes second entering step. Accordingly, since the cutting depth per one cut can be determined by the first oblique entering (entering step) and subsequent cutting in the opposite direction (second entering step), the increase of the load applied to the tool can be further moderate. The carving step may be subsequently performed while keeping a constant cutting depth.

A processing machine according to the present invention includes a table for the workpiece to be set onto; a rotary tool; a spindle head to which the rotary tool is attached; a machine body having the table and the spindle head relatively movable in three-dimensional directions; and a controller for controlling a drive of the machine body. The processing machine is characterized in that the controller includes a means for relatively moving the rotary tool and the workpiece so that the rotary tool obliquely enters the processing surface of the workpiece and the rotary tool subsequently moves in a direction opposite to the entering direction.

According to the above arrangement, the effect of the above-described processing method, i.e. restraining the abrupt increase of the load applied to the rotary tool in entering the workpiece to avoid the decrease in tool's life span can be obtained. Further, since the relative movement of the rotary tool and the workpiece is done automatically, the processing can be efficiently conducted.

BRIEF DESCRIPTION OF THE DRAWINGS

FIGS. 7(A) and 7(B) are illustrations showing a movement path of a tool in carving an annular convex tread in the aforesaid embodiment;

FIG. 8(A) is an illustration of up-cut;

FIG. 8(B) is an illustration of down-cut;

DETAILED DESCRIPTION OF PREFERRED EMBODIMENT(S)

A preferred embodiment according to the present invention will be described below with reference to the attached drawings.

Figure 1:
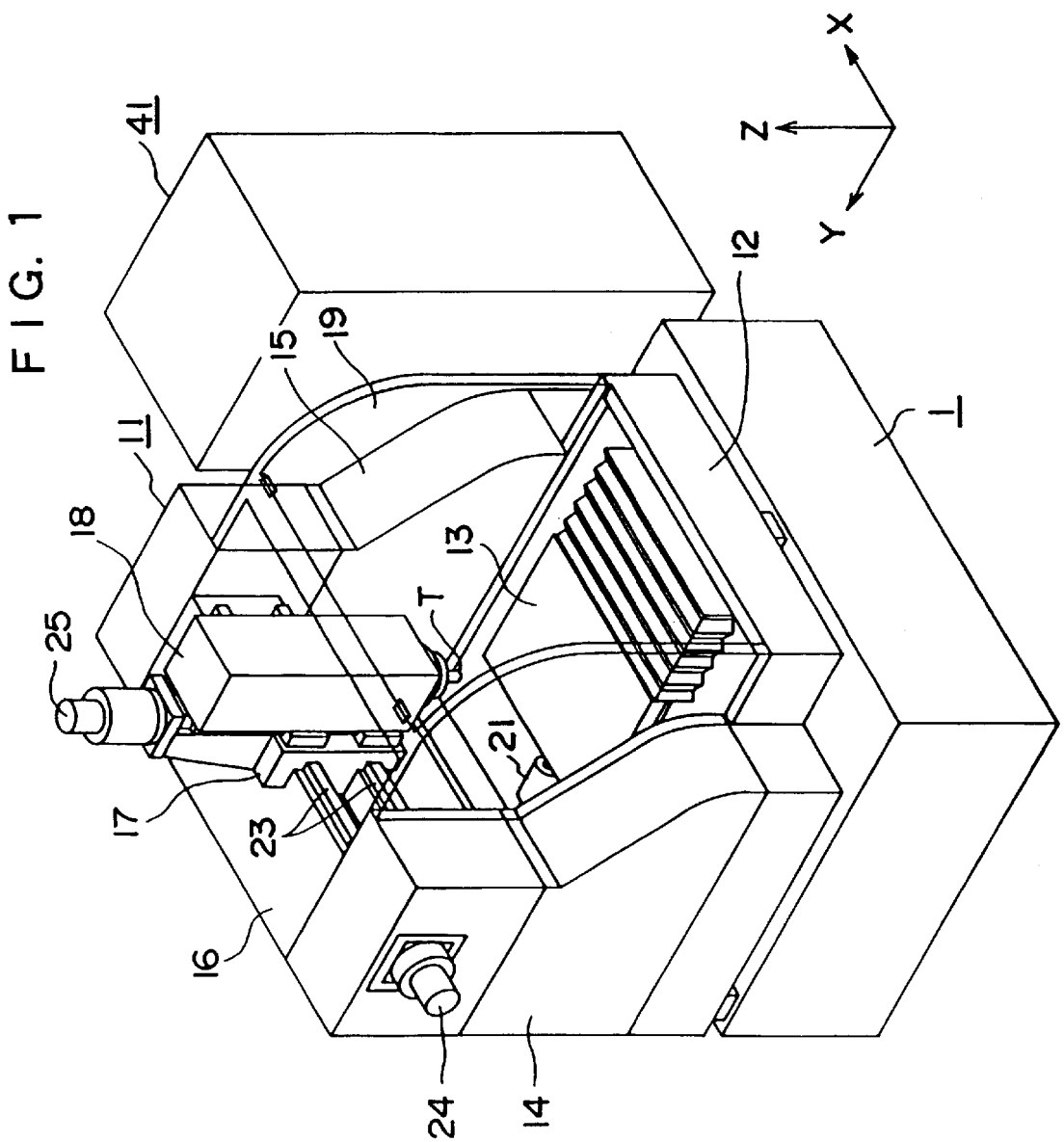
FIG. 1 is a perspective view showing a preferred embodiment of a processing machine according to the present invention.

FIG. 1 is a perspective view showing a processing machine on which a profile processing method according to the present invention is applied. As shown in FIG. 1, the processing machine according to the present embodiment is a machine tool controlled by a NC device, and has a base 1, a machine body 11 mounted on the base 1 and a NC device 41 as a controller for controlling the drive of the machine body 11.

The machine body 11 is composed of a bed 12 mounted on the upper side of the base 1 through a leveler or the like, a table 13 provided on an upper side of the bed 12 movably in back and forth direction (Y-axis direction), a pair of column 14 and 15 erectly set on both side of the bed 12, a cross rail 16 stretched between upper portions of the columns 14 and 15, a slider 17 provided along the cross rail 16 movably in right and left direction (X-axis direction), a spindle head 18 provided to the slider 17 elevatably in up and down direction (Z-axis direction), and a splash guard 19 which covers a front part between the column 14 and 15, of which inside is visible and which can be opened and closed in up and down direction with the upper end thereof as a fulcrum.

The bed 12 has a Y-axis driving mechanism 21 which moves the table 13 in Y-axis direction accompanied by a guide (not shown) for guiding the table 13. A feed screw mechanism consisting of a motor and a feed screw shaft rotated by the motor is employed as the Y-axis driving mechanism 21.

The side shape of the respective columns 14 and 15 is configured approximately triangularly, having wider bottom portion than upper portion. Accordingly, the bottom portion is stable enough to decrease generating a vibration even when a high-speed rotating spindle head 18 is used.

The cross rail 16 has two guide rails 23 for movably guiding the slider 17 as well as X-axis driving mechanism 24 for moving the slider 17 in X-axis direction.

The slider 17 has a guide (not shown) for guiding the spindle head 18 in Z-axis direction as well as a Z-axis driving mechanism 25 for elevating the spindle head 18 in Z-axis direction. As in the Y-axis driving mechanism 21, the driving mechanisms 24 and 25 also employ a feed screw mechanism composed of a motor and a feed screw shaft rotated by the motor.

Figure 2:
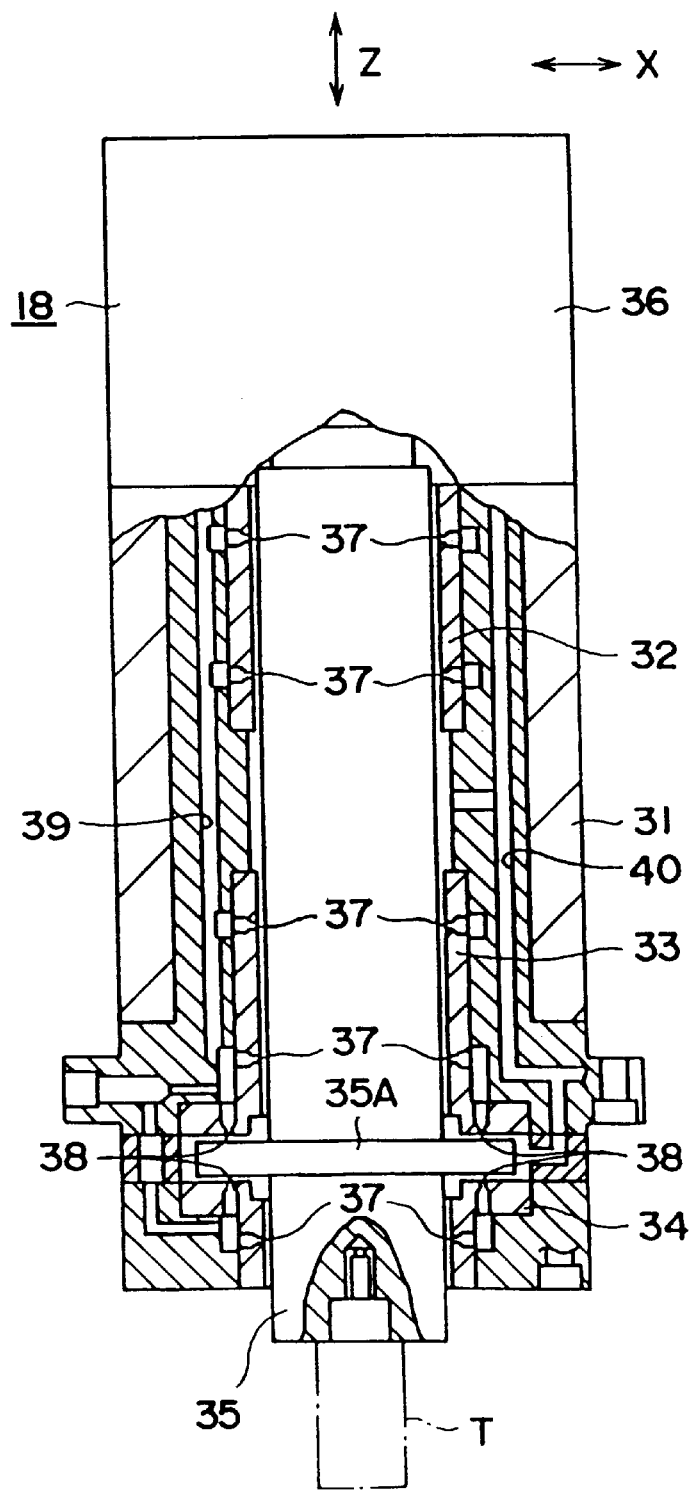
FIG. 2 is a cross-section of a spindle head according to the aforesaid embodiment.

As shown in FIG. 2, the spindle head 18 is composed of an air-bearing supported spindle head. More specifically, the spindle head 18 is composed of an air-bearing supported spindle head having a housing 31 elevatably provided to the cross rail 16 elevated by the Z-axis driving mechanism 25, a spindle 35 supported in parallel to Z-axis direction to the housing 31 rotatably through the air-bearings 32, 33 and 34 and having a fringe 35A in the halfway thereof, and a motor 36 for rotatively driving the spindle 35. The spindle 35 can be rotated at a high-speed of 30,000 to 50,000 rpm.

A plurality of air-blowing holes 37 which blow air toward the spindle 35 in a direction perpendicular to the axis of the spindle are formed on an inner side of the respective air-bearings 32, 33 and 34. The air blown by the air-blowing holes 37 forms a radial bearing for supporting the spindle 35 in a radial direction. Another plurality of air-blowing holes 38 which blow air toward the fringe 35A of the spindle 35 are formed on an end side of the respective air-bearings 33 and 34 respectively opposing in axis-direction.

The air blown by the air-blowing holes 38 forms a thrust bearing for supporting the spindle 35 in a thrust direction. Incidentally, in FIG. 2, 39 is an air-supply passage for providing air to the respective air-blowing holes 37 and 38, 40 is an air-outlet passage and T is a rotary tool such as an end mill.

Figure 3:
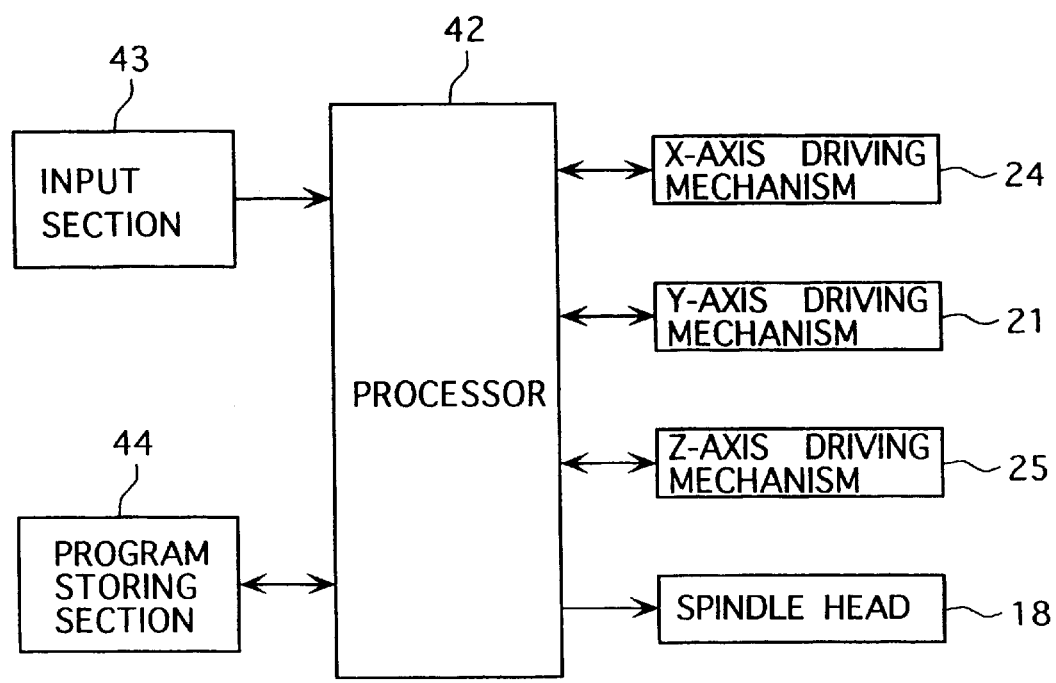
FIG. 3 is a block diagram showing a NC device and a driving mechanism according to the aforesaid embodiment.

As shown in FIG. 3, the NC device has a processor 42. To the processor 42, an input section 43 and a program storing section 44 for storing a program input through the input section 43 is connected as well as the driving mechanisms 21, 24 and 25 and the spindle head 18. The processor 42 has a means for relatively moving the rotary tool T and a workpiece so that the rotary tool T obliquely enter the processing surface of the workpiece and subsequently the rotary tool T is moved oppositely to the entering direction in carving a concave portion or a convex portion to the workpiece in accordance with a program set and stored in the program storing section 44, and a processing means for selecting a relative movement path of the rotary tool T and the workpiece so that the workpiece is always down-cut when the workpiece is carved by the rotary tool T.

Here, down-cut and up-cut will be described below.

As shown in FIG. 8(A), in conducting the up-cut (cutting upward), the edge initially touches a surface which has been carved and gradually cuts uncarved portion, in other words, a swarf thickness in conducting the up-cut (cutting upward) starts from zero and gradually increases. In this case, when the workpiece is begun to be carved, it is impossible to cut the workpiece and the edge just rubs the surface of the workpiece since the swarf thickness, i.e. the amount by which the edge cut the workpiece, is zero. When the swarf thickness gets sufficiently large, the workpiece is substantially carved. During the time, the edge is rubbed on the surface of the workpiece with a certain amount of pressure being applied, which causes abrasion of edges and burn on the surface of the workpiece.

On the other hand, as shown in FIG. 8 (B), the edge in conducting down-cut (cutting downward) first greatly enter an uncarved portion and gradually decreases cutting amount, in other words, a swarf thickness in conducting the down-cut (cutting downward) is the greatest at the beginning of cutting and is decreased gradually. Though the swarf thickness is zero at a final carving stage, the edge moves to separate from the workpiece and scarcely rubs the surface of the workpiece, thereby hardly causing edge abrasion and burn on the surface of the workpiece.

Therefore, the up-cut (cutting upward) is shorter in tool's life and is more likely to cause grinding burn than the down-cut (cutting downward). Accordingly, carving by the down-cut is desirable.

The effect of the present embodiment will be described below with reference to FIGS. 4 to 7.

When the workpiece is carved, the table 13 and the spindle head 18 is relatively moved in X, Y and Z-axis direction by a command from the NC device 41 to carve the workpiece by the rotary tool T attached to the spindle 35. More specifically, the workpiece is carved by the rotary tool T attached to the spindle 35 by moving the table 13 in Y-axis direction through the Y-axis driving mechanism 21, and by moving the spindle head 18 in X and Z-axis direction through the X-axis driving mechanism 24 and Z-axis driving mechanism 25.

Figure 4:
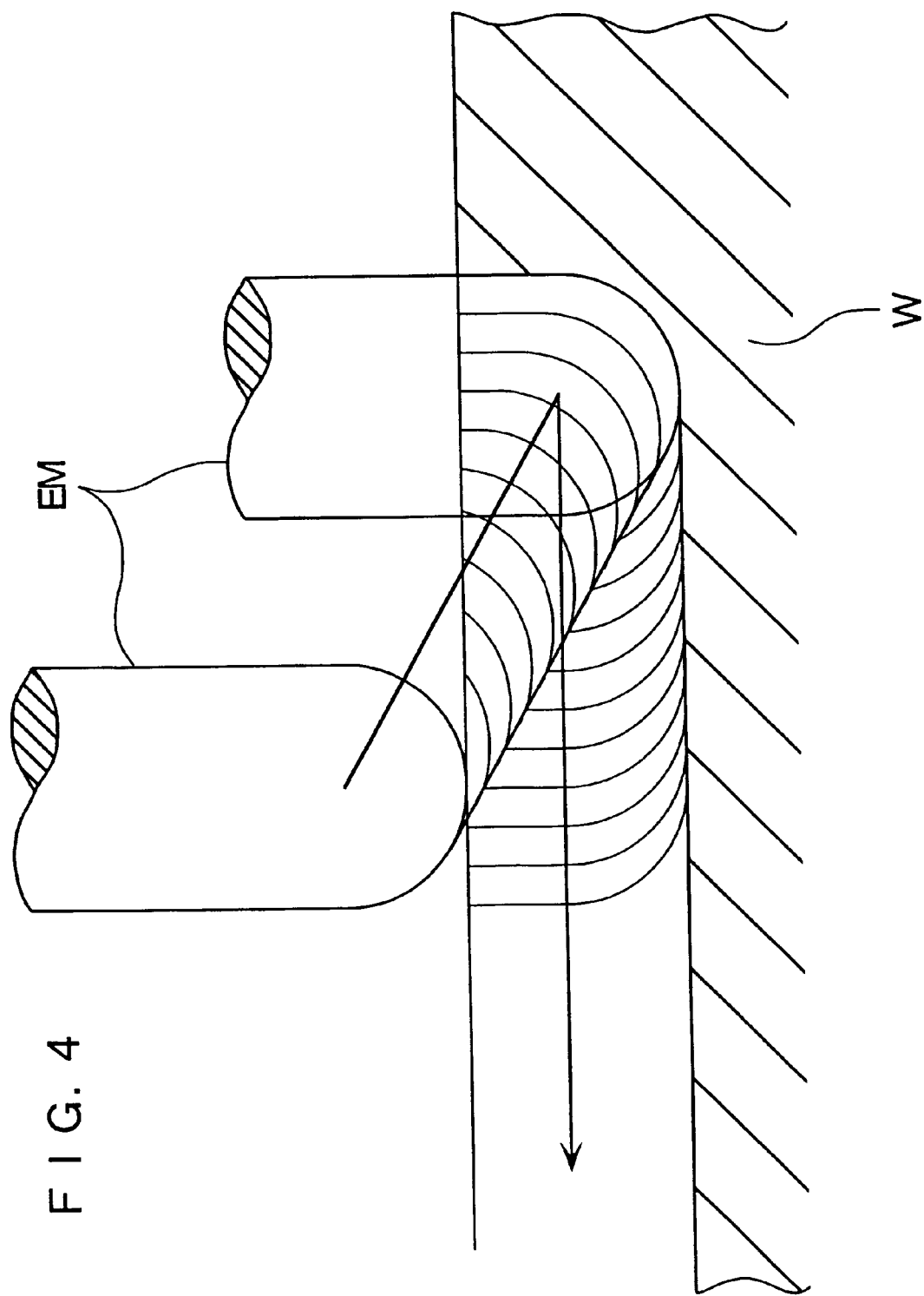
FIG. 4 is an illustration showing a locus of a rotary tool in entering a workpiece.

First, the rotary tool T enters the processing surface of the workpiece W. As shown in FIG. 4, the rotary tool T (an end mill EM here) is obliquely entered the processing surface of the workpiece W (cutting process). Incidentally, it is preferable that the entering angle relative to the processing surface of the workpiece W is relatively moderate. Accordingly, since a contact surface of the workpiece W contacting the end mill EM gradually increases, in other words, since the load applied to the end mill EM gradually increases, there is no abrupt increase of the load applied to the end mill EM.

When the cutting depth of the end mill EM reaches a predetermined cutting depth, the end mill EM is moved parallel to the processing surface of the workpiece W oppositely to the entering direction while keeping the cutting depth (carving step). At that time, since the end mill EM gradually cut a sloping portion remaining after the oblique cutting, the load applied to the end mill EM does not increase abruptly. Accordingly, the decrease in the tool's life span in cutting can be avoided.

After entering the end mill EM into the workpiece W, the end mill Em is first relatively moved along the outermost path of the annular groove 101 when the annular groove 101 shown in FIGS. 5(A) (B) is carved. The annular groove 101 is a carved region cut by the end mill EM and has a boundary 105 defined by the annular groove 101. When an annular convex tread 102 is carved (FIGS. 7(A), 7(B)), the boundary 105 is defined by the annular convex tread 102. The boundary 105 is not limited to those shapes shown, but can be defined by a carved region of any shape.

If the rotating direction of the end mill EM is clockwise in FIG. 5(A), the relative movement path of the end mill EM and the workpiece W is set counterclockwise. Accordingly, the outermost side of the annular groove 101 is carved in down-cut shown in FIG. 8(B). The cutting amount of the end mill EM in Z-axis direction is set as a fraction of depth D, and the end mill EM is moved on the same path in a plurality of times with the same cutting amount to carve depth D.

Figure 6:
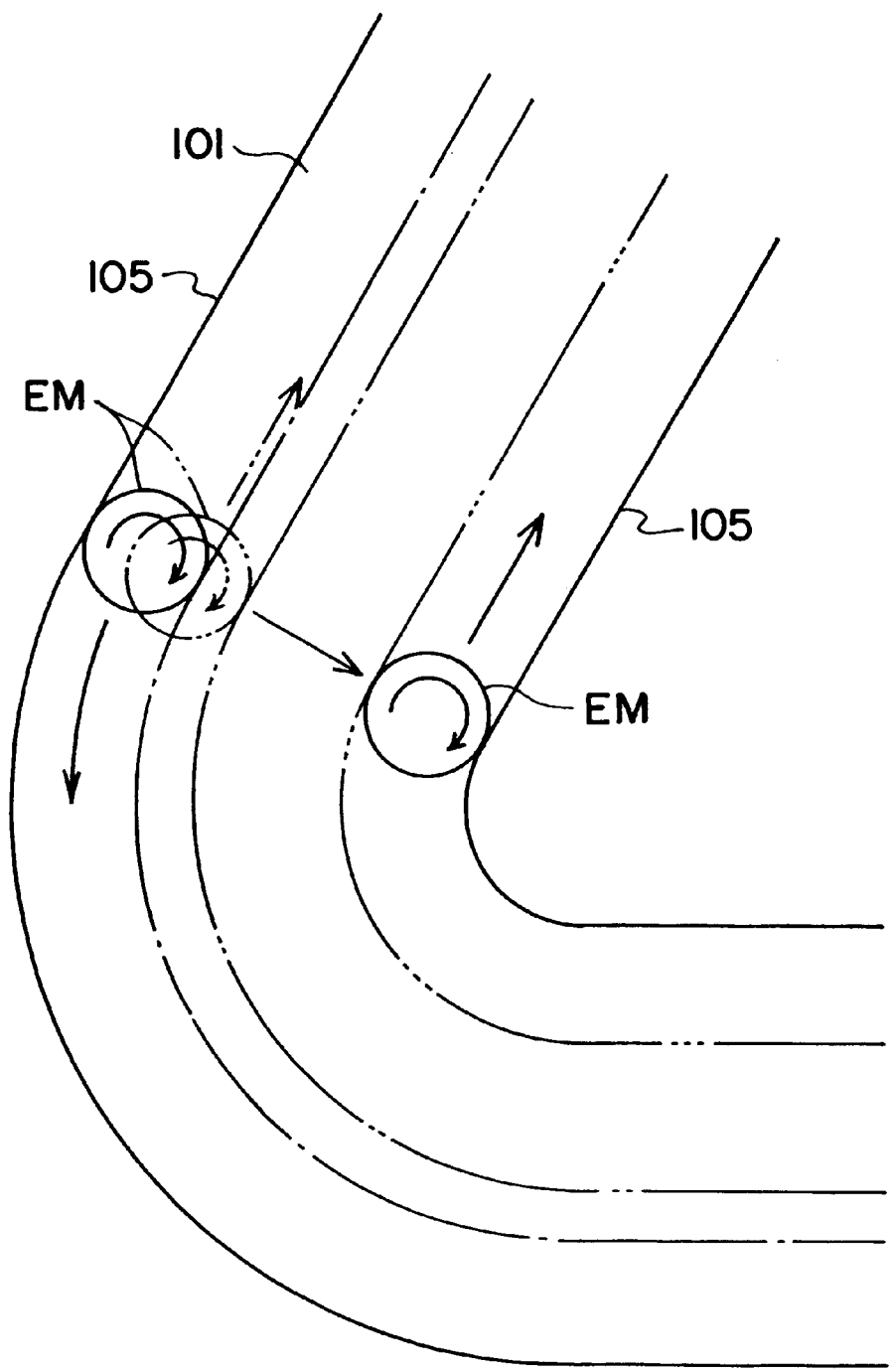
FIG. 6 is an enlarged view of a part of the FIG. 5(A)

Consequently, as shown in enlarged view of FIG. 6, after the end mill EM is moved at a predetermined amount inwardly in width direction of the annular groove 101, the end mill EM is relatively moved against the workpiece W oppositely to previous movement (relative movement path of the outermost side). That is, the end mill EM is relatively moved clockwise in FIG. 6 along the annular groove 101. Accordingly, the carved surface (a surface shown in double dotted line in FIG. 6) is carved in down-cut shown in FIG. 8(B). At this time, the cutting amount of the end mill EM in Z-axis direction stays depth D of the annular groove 101 and only the inwardly cutting amount of the annular groove 101 in the width direction is carved.

The workpiece is gradually carved inwardly while the end mill EM is relatively moved clockwise along the annular groove 101. The same movement is repeated until the end mill EM reaches the innermost path of the annular groove 101. Accordingly, all the processing surfaces are carved in down-cut thereby obtaining good finish surface accuracy in all of the carved surfaces and curbing the decrease in the tool's life span.

When the annular convex tread 102 shown in FIGS. 7(A)(B) is carved, following steps are taken.

Figure 5:
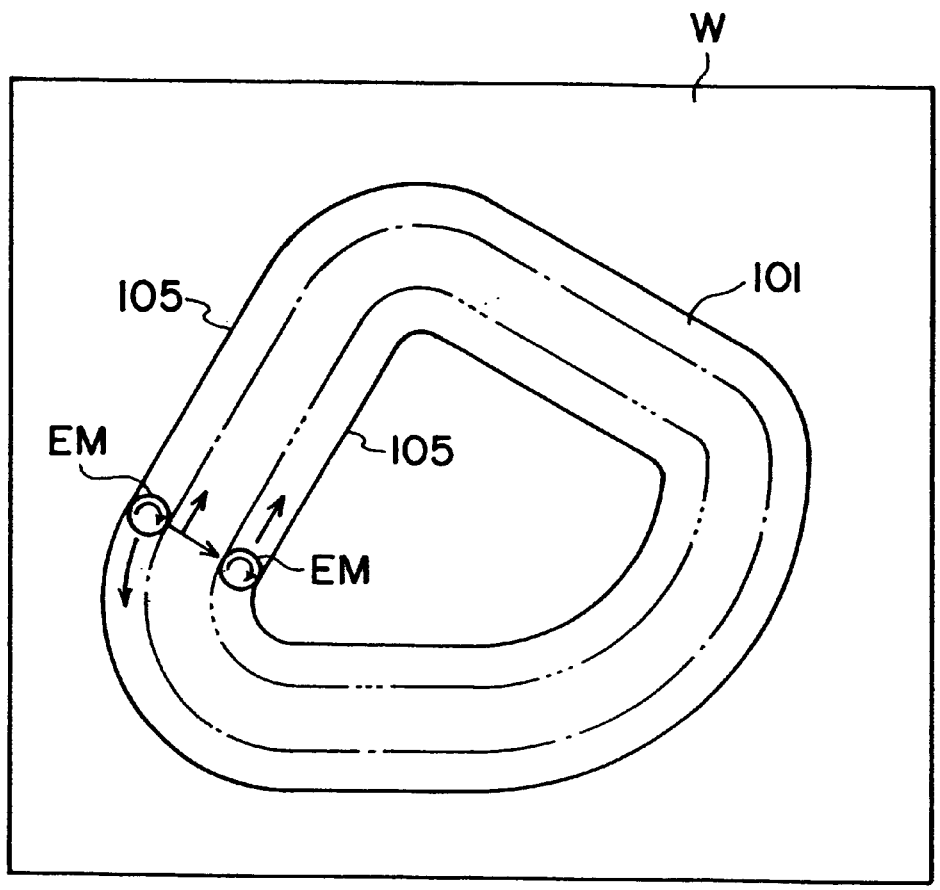
FIGS. 5(A) and 5(B) are illustrations showing a movement path of a tool in carving an annular groove in the aforesaid embodiment.
Figure 5:
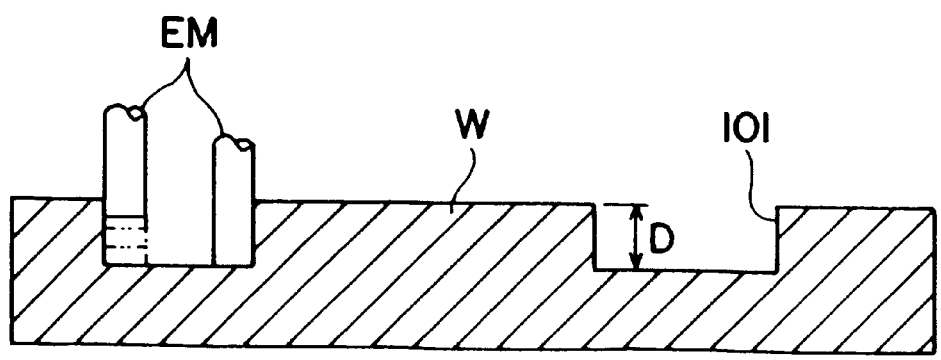

Firstly, when the inner side to the annular convex tread 102 is carved, all the carved surfaces can be down-cut in accordance with the method shown in FIGS. 5 and 6.

On the other hand, when the outer side to the annular convex tread 102 is carved, the end mill EM is relatively moved clockwise along the outermost path of the annular convex tread 102. Accordingly, the outermost side of the annular convex tread 102 is down-cut.

Consequently, after relatively moving the end mill EM outwardly at a predetermined amount against the annular convex tread 102, the end mill EM is relatively moved oppositely to the previous movement (the relative movement path of the outermost side), i.e. counterclockwise. Accordingly, outer carved surface of the annular convex tread 102 is carved in down-cut.

Incidentally, the cutting of the annular convex tread 102 is divided in a plurality of times only when the outermost side of the annular convex tread 102 is carved.

According to the present embodiment, since the end mill EM is obliquely entered to the processing surface of the workpiece W (entering step) and subsequently moved oppositely to the entering direction and parallel to the processing surface while keeping the cutting amount at a constant level, the load applied to the end mill EM is gradually increased. In other words, since the load applied to the end mill EM does not increase abruptly, the decrease in tool's life span in entering can be restrained.

Further, the end mill EM is gradually moved inwardly from the outermost side of the annular groove 101 when the profile of the annular groove 101 is carved on the workpiece W. And the relative movement path is selected so that the outermost side of the annular groove 101 is down-cut when the outermost side is carved, and relative movement path opposite to the previous relative movement path of the outermost side is selected when further inner side is carved. Accordingly, a good surface accuracy for all carving surfaces can be obtained and decrease in the tool's life span can be curbed.

Particularly, since the end mill EM is relatively moved from the outermost side to inside of the annular groove 101, an increase in the load applied to the end mill (when the end mill is moved from inside to outside, the contact area of the end mill and the workpiece is enlarged, thereby increasing the load), which is a problem in conventional processing of moving the end mill from inside to outside, can be decreased. Accordingly, the decrease in the tool's life span can be curbed.

When the profile of the annular convex tread 102 is carved on the workpiece W, the end mill EM is gradually moved from the outermost side of the annular convex tread 102 to outside. And the relative movement path of the end mill EM and the workpiece W is selected so that the outermost side of the annular convex tread 102 is down-cut when the outermost side is carved, and the relative movement path opposite to the previous relative movement path of the outermost side is selected when the further outer side is carved. Accordingly, a good surface accuracy for all carving surfaces can be obtained and decrease in the tool's life span can be curbed as in the annular groove 101, when the profile of the annular convex tread is carved.

Further, since the spindle head 18 is the air-bearing spindle head which rotatably supports the spindle 35 by the air-bearings 32, 33 and 34 thereby obtaining high-speed rotation with high-accuracy of the air-bearing spindle head, the process can be efficiently conducted with a great cutting feed speed.

Figure 9:
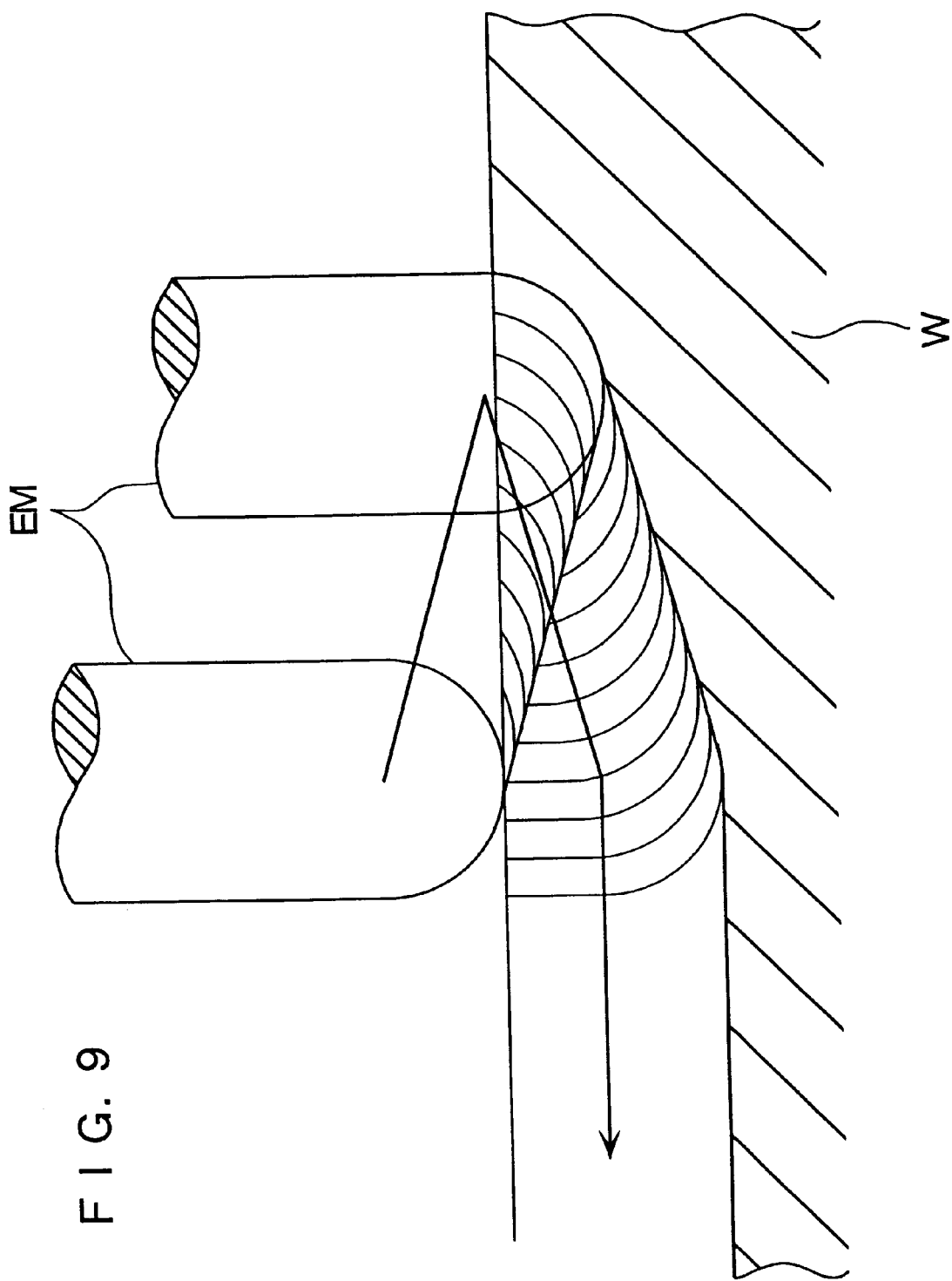
FIG. 9 is an illustration showing another locus of the rotary tool in entering the workpiece.
Figure 10:
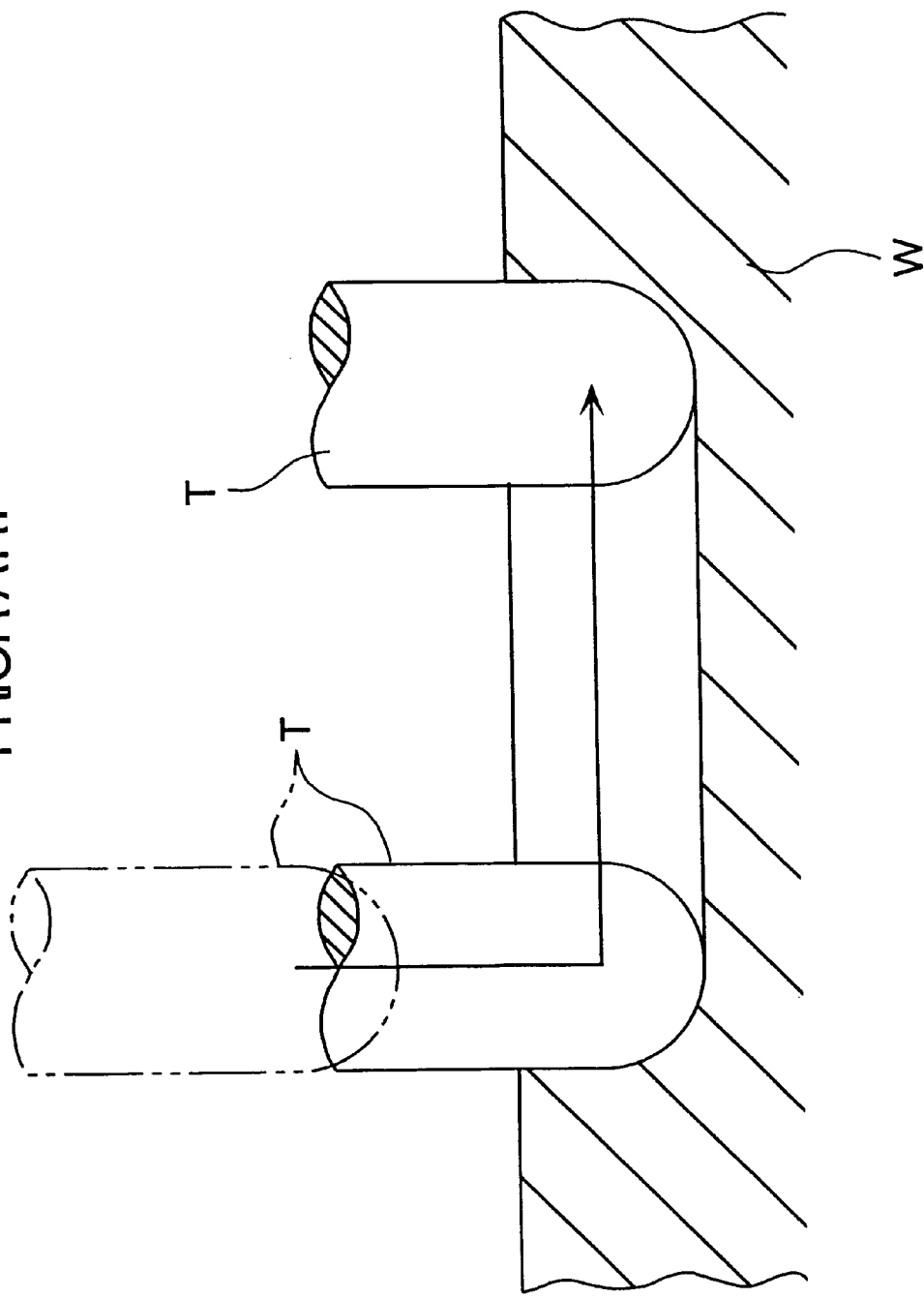
FIG. 10 is an illustration showing a locus of a conventional rotary tool.
Figure 11:
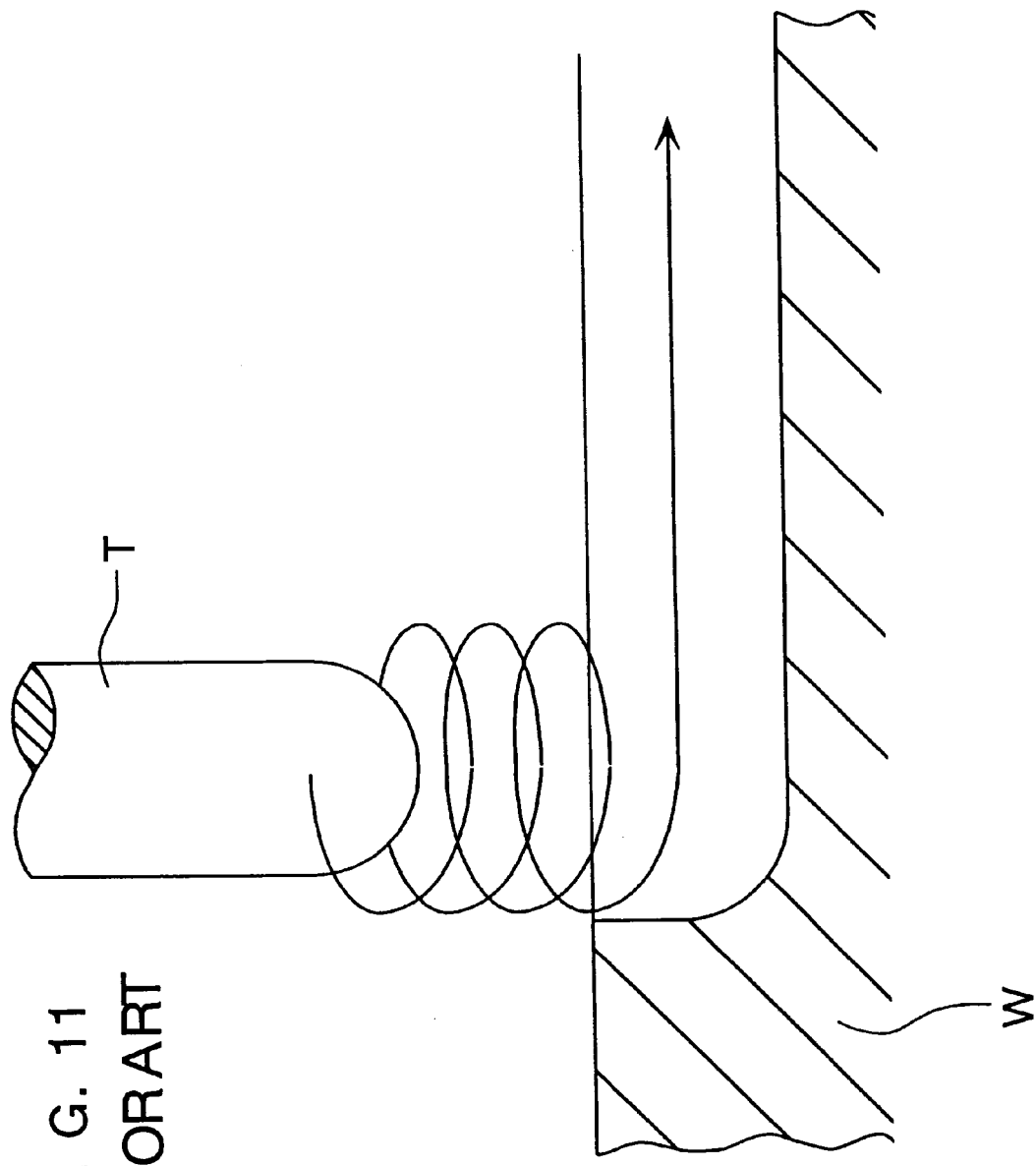
FIG. 11 is an illustration showing another locus of a conventional rotary tool.

According to the above-described embodiment, after entering the end mill EM obliquely into the processing surface of the workpiece W, the end mill EM is moved oppositely to the entering direction in the subsequent carving step while keeping the cutting depth. On the other hand, as shown in FIG. 9, it is also preferable that the end mill EM is first obliquely entered into the processing surface of the workpiece W (entering step), moved in the direction opposite to the entering direction while gradually increasing the cutting depth (second entering step) and moved parallel to the processing surface of the workpiece W after the cutting depth reaches the predetermined level (carving step).

Accordingly, since the cutting depth per one carving can be set by the first oblique entering of the entering step and the opposite entering of the subsequent second entering step, the increase in the load applied to the end mill EM can be further relaxed.

The spindle head 18 is movable in X and Z-axis direction and the table 13 is movable in Y-axis direction in the above-described embodiment, however, any structure can be adopted as long as the rotary tool T and the workpiece W can be relatively moved in three-dimensional directions (X, Y and Z-axis direction).

Further, the spindle head 18 of the above-described embodiment is an air-bearing spindle head which rotatably supports a spindle with air-bearings. However, the scope of the present invention is not limited to the embodiment, but a spindle head which rotatably supports a spindle with a ball bearing or the like can also be adopted.

What is claimed is:

1. A method of processing a workpiece using a rotary tool, comprising the steps of:

causing the rotary tool to enter a processing surface of the workpiece, the workpiece having a length in an X direction, a width in a Y direction, and a thickness in a Z direction, by moving the rotary tool and the workpiece relative to each other in the X direction, the Y direction, and the Z direction, so that the rotary tool obliquely enters the processing surface along an initial X, Y, and Z moving direction to a depth in the Z direction;

carving the workpiece to produce a carved region by a series of iterative cutting paths by first moving the rotary tool and the workpiece relative to each other in a direction opposite to the initial X and Y moving direction during the entering step while keeping the depth constant, wherein each of said cutting paths in said series of iterative cutting paths is a curved path; and moving the rotary tool and the workpiece relative to each other incrementally to a position for a next iteration of said iterative cutting paths.

2. The processing method according to claim 1, wherein a cutting depth of the workpiece by the rotary tool is kept constant during the carving step.

3. The processing method according to claim 2, wherein a cutting depth of the workpiece by the rotary tool is gradually increased during the carving step.

* * * * *